(12) United States Patent
Rho

(10) Patent No.: US 7,847,894 B2
(45) Date of Patent: *Dec. 7, 2010

(54) TRANSREFLECTIVE LIQUID CRYSTAL DISPLAY

(75) Inventor: Soo-Guy Rho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/619,392

(22) Filed: Jan. 3, 2007

(65) Prior Publication Data

US 2007/0103627 A1 May 10, 2007

Related U.S. Application Data

(62) Division of application No. 10/213,686, filed on Aug. 6, 2002, now Pat. No. 7,176,996.

(30) Foreign Application Priority Data

Feb. 26, 2002 (KR) .......................... 2002-0010282

(51) Int. Cl.
*G02F 1/1335* (2006.01)

(52) U.S. Cl. .................. 349/114; 349/64; 349/106; 349/147

(58) Field of Classification Search .................. 349/114
See application file for complete search history.

(56) References Cited

U.S. PATENT DOCUMENTS

| | | | |
|---|---|---|---|
| 5,146,355 A | 9/1992 | Prince et al. | |
| 5,729,313 A * | 3/1998 | Mitsui | 349/106 |
| 5,805,252 A | 9/1998 | Shimada et al. | |
| 6,195,140 B1 * | 2/2001 | Kubo et al. | 349/44 |
| 6,456,347 B1 | 9/2002 | Motomura et al. | |
| 6,542,209 B2 * | 4/2003 | Kim et al. | 349/106 |
| 6,597,418 B2 * | 7/2003 | Moon et al. | 349/98 |
| 6,606,139 B2 | 8/2003 | Yoshii et al. | |
| 6,621,543 B2 | 9/2003 | Moon | |
| 6,633,353 B1 * | 10/2003 | Seki et al. | 349/113 |
| 6,909,479 B2 * | 6/2005 | Iijima | 349/109 |
| 7,176,996 B2 * | 2/2007 | Rho | 349/114 |
| 2002/0041356 A1 * | 4/2002 | Tanada et al. | 349/158 |
| 2002/0054257 A1 * | 5/2002 | Tanada et al. | 349/113 |
| 2002/0054269 A1 * | 5/2002 | Maeda et al. | 349/181 |

FOREIGN PATENT DOCUMENTS

| | | |
|---|---|---|
| EP | 1 109 053 | 6/2001 |
| JP | 10068944 A | 3/1998 |
| JP | 2000019563 A | 1/2000 |
| JP | 2001-062925 A | 3/2001 |
| JP | 2002-055333 A | 2/2002 |
| JP | 2001 305 529 | 1/2007 |

* cited by examiner

*Primary Examiner*—Andrew Schechter
(74) *Attorney, Agent, or Firm*—Cantor Colburn LLP

(57) ABSTRACT

Disclosed are a transreflective type LCD and a method of manufacturing the same. A color filter substrate is formed with a light transreflective member for reflecting an external light or transmitting an artificial light and a visual angle increasing member for increasing the visual angle of the light from the light transreflective member. A thickness of a color filter varies to obtain a uniformity of the light from the light transreflective member regardless of the transmissive and the reflective modes. The light from the light transreflective member is provided through a TFT substrate to a user as an image.

12 Claims, 19 Drawing Sheets

TRANSREFLECTIVE LIQUID CRYSTAL DISPLAY

CROSS REFERENCE TO RELATED APPLICATIONS

This application is a divisional application of U.S. application Ser. No. 10/213,686 filed Aug. 6, 2002, which claims priority to and the benefit of Korean Patent Application No. 10-2002-0010282, filed Feb. 26, 2002, both of which are incorporated by reference herein in their entirety.

BACKGROUND OF THE INVENTION

1. Field of the Invention

The present invention relates to a liquid crystal display (LCD), and more particularly to a transreflective type LCD and a method of manufacturing the same for increasing an available efficiency of a light and a color reproducibility of an image.

2. Description of the Related Art

In the so-called information society of these days, electronic display devices are important as information transmission media and various electronic display devices are widely applied to industrial apparatus or home appliances. Recently, demand has increased for a new electronic display devices such as an LCD having characteristics such as thin thickness, light weight, low driving voltage and low power consumption. Manufacturing of an LCD has been improved due to advances in semiconductor technology.

The LCD is classified as a transmissive type LCD that displays an image using a first light provided from an external, a reflective type LCD that displays an image using a second light generated by a light generating means installed therein, and a transreflective type LCD that displays the image using either the first light or the second light. The transreflective type LCD displays an image using the first light in a case where an amount of the first light is enough to display the image and displays the image using the second light generated by consuming electricity charged into itself where the amount of the first light is not enough to display the image. Thus, the transreflective type LCD reflects the first light and transmits the second light.

FIG. 1 is a cross-sectional view showing an internal structure of an LCD panel of a conventional transreflective type LCD.

Referring to FIG. 1, the transreflective type LCD 100 includes a color filter substrate 110, a liquid crystal 120 and a TFT (thin film transistor) substrate 130. The TFT substrate 130 includes a transparent substrate 131, a TFT 132, an organic insulating layer 133, a transparent electrode 134, a reflective electrode 135 and an alignment layer 136 having an alignment groove 136a.

The TFT 132 is disposed on the transparent substrate 131 in a matrix shape. The TFT 132 outputs a data signal from an external in response to a timing signal. The organic insulating layer 133 is disposed over the transparent substrate 131 to cover the TFT 132. The organic insulating layer 133 has an uneven surface 133a and a contact hole 133b to expose an output terminal of the TFT 132. The transparent electrode 134 is formed by forming an ITO (Indium Thin Oxide) thin film layer over the organic insulating layer 133 and patterning the ITO thin film layer to be connected with the output terminal of the TFT 132. The reflective electrode 135 is disposed on the transparent electrode 134. The reflective electrode 135 has an opening 135a and a portion of the transparent electrode 134 is exposed through the opening 135a. The alignment layer 136 is disposed over the transparent substrate 131 to cover the reflective electrode 135 and the alignment groove 136a is formed on the alignment layer 136.

The color filter substrate 110 includes a transparent substrate 111, a black matrix 112, a color filter 113, a common electrode 114 and an alignment layer 115. The black matrix 112 disposed on the transparent substrate 111 has a lattice shape and faces an insulating space 135c disposed adjacent to the reflective electrode 135 of the TFT substrate 130. The transparent substrate 111 includes the color filter 113 in a matrix shape corresponding to the reflective electrode 135. The color filter 113 includes a red color filter for emitting a monochromatic light having a red wavelength, a green color filter for emitting a monochromatic light having a green wavelength and a blue color filter for emitting a monochromatic light having a blue wavelength by filtering the light.

The common electrode 114 is disposed over the transparent substrate 111 to cover an upper surface of the color filter 113. The alignment layer 115 is disposed on the transparent substrate 111 to cover the common electrode 114 and the alignment groove 115a is formed on the alignment layer 115. The color filter substrate 110 is combined to the TFT substrate 130. The liquid crystal 120 is injected between the color filter substrate 110 and the TFT substrate 130.

Where the amount of the light is not enough to display the image, the transreflective type LCD supplies a light having a first direction from the TFT substrate 130 toward the color filter substrate 110 by consuming an electric energy charged therein. In this transmissive mode, the light having the first direction is supplied to a user 140 through the opening 135a, the liquid crystal 120, the color filter 113 and the transparent substrate 111. Where an amount of the first light is enough to display the image, the transreflective type LCD receives a light having a second direction from an external and a lamp (not shown) is turned off. In this reflective mode, the transreflective type LCD receives the light having the second direction through the transparent substrate 111, the color filter 113, the liquid crystal 120 and the reflective electrode 135 and the light incident into the transreflective type LCD is supplied to the user 140 through the liquid crystal 120, the color filter 113 and the transparent substrate 111.

The light (hereinafter, referred to as an artificial light) from the color filter 113 in the transmissive mode has a different color tone and an impression of the color from those of the light (hereinafter, referred to as a natural light) from the color filter 113 in the reflective mode. This is because a light path inside the LCD is different according to the light source. The natural light passes through the color filter 113 twice in the reflective mode and the artificial light passes through the color filter 113 only once in the transmissive mode. That is, the length through which the natural light passes is about twice greater than the length through which the artificial light passes. The differences according to the display mode between the transmissive mode and the reflective mode result in a deterioration of the image.

Further, it is difficult to maintain a shape of the uneven surface 133a of the organic layer 133 due to thin film layers disposed under the organic layer 133. The uniformity of the light is not desirably maintained in the transreflective LCD, so that display and visual properties are deteriorated.

BRIEF SUMMARY OF THE INVENTION

The present invention provides a transreflective type LCD for increasing an available efficiency of a light and a color reproducibility of an image.

The present invention provides a method of manufacturing a transreflective type LCD for increasing an available efficiency of a light and a color reproducibility of an image.

In one aspect of the invention, a transreflective type LCD comprises: a first substrate including a first transparent substrate, a power supply means for supplying a power voltage to the first transparent substrate and a first transparent electrode for receiving the power voltage from the power supply means; a second substrate including a second transparent substrate having a visual angle improving means and facing to the first transparent substrate, a light transreflective means for transmitting a first light supplied from the second transparent substrate to the first transparent substrate and reflecting a second light supplied from the first transparent substrate to the second transparent substrate in a direction of the first light, a color filter disposed on the transreflective means and a second electrode disposed over the color filter; and a liquid crystal interposed between the first substrate and the second transparent.

In another aspect, a method of manufacturing a transreflective type LCD comprises: fabricating a first substrate by forming a power supply unit for supplying a power voltage and a first transparent electrode connected with the power supply unit on a first transparent substrate; fabricating a second substrate by forming a light transreflective means on a second transparent substrate, for transmitting a first light supplied from the second transparent substrate to the first transparent substrate and reflecting a second light supplied from the first transparent substrate to the second transparent substrate, forming a color filter on the transreflective means and forming a second electrode over the color filter; combining the first substrate to the second substrate; and interposing a liquid crystal between the first and the second substrates.

BRIEF DESCRIPTION OF THE DRAWINGS

The above and other advantages of the present invention will become readily apparent by reference to the following detailed description and the accompanying drawings wherein.

DETAILED DESCRIPTION OF THE PREFERRED EMBODIMENTS

Figure 1:
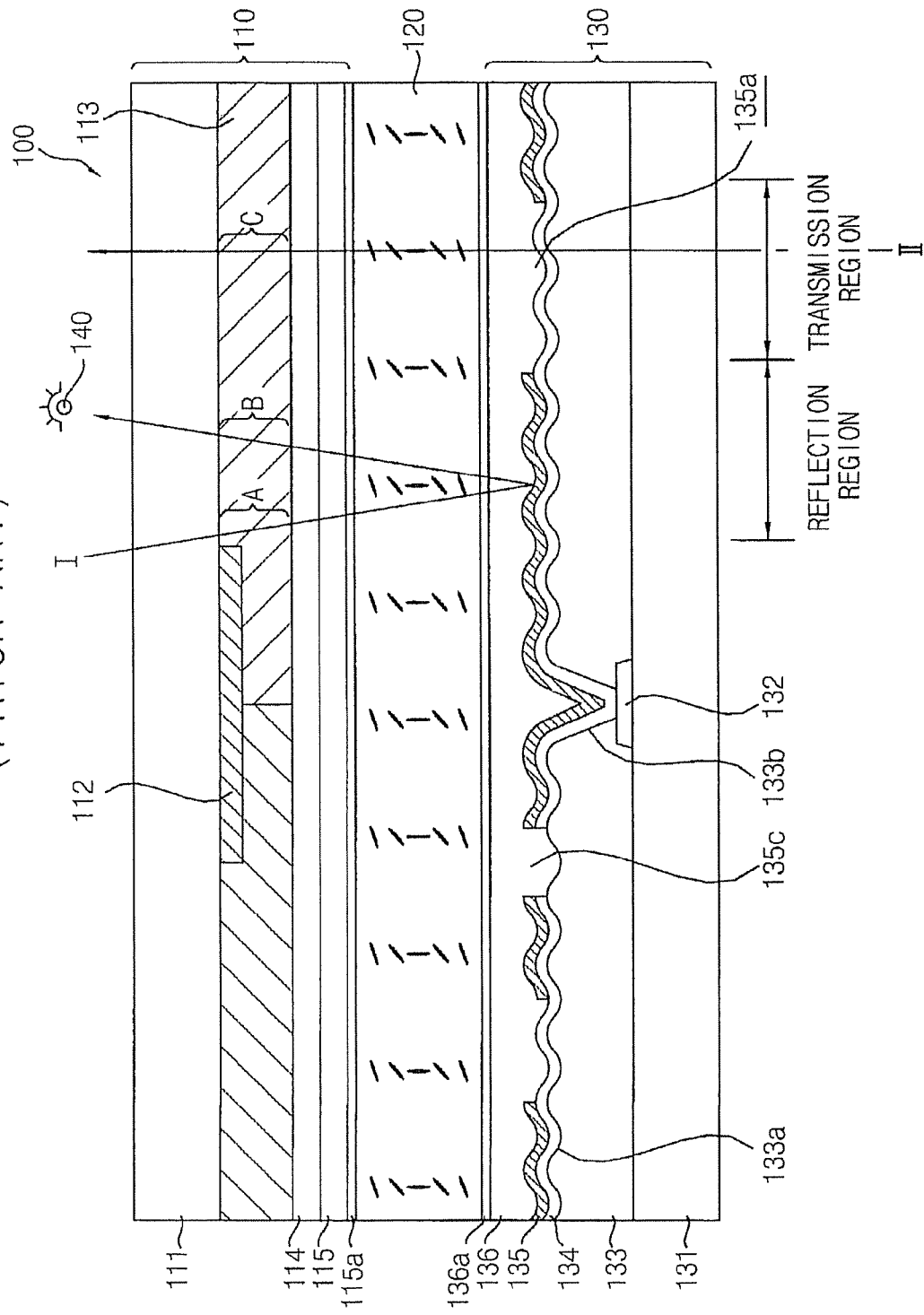
FIG. 1 is a cross-sectional view showing an internal structure of an LCD panel of a conventional transreflective type LCD.
Figure 2:
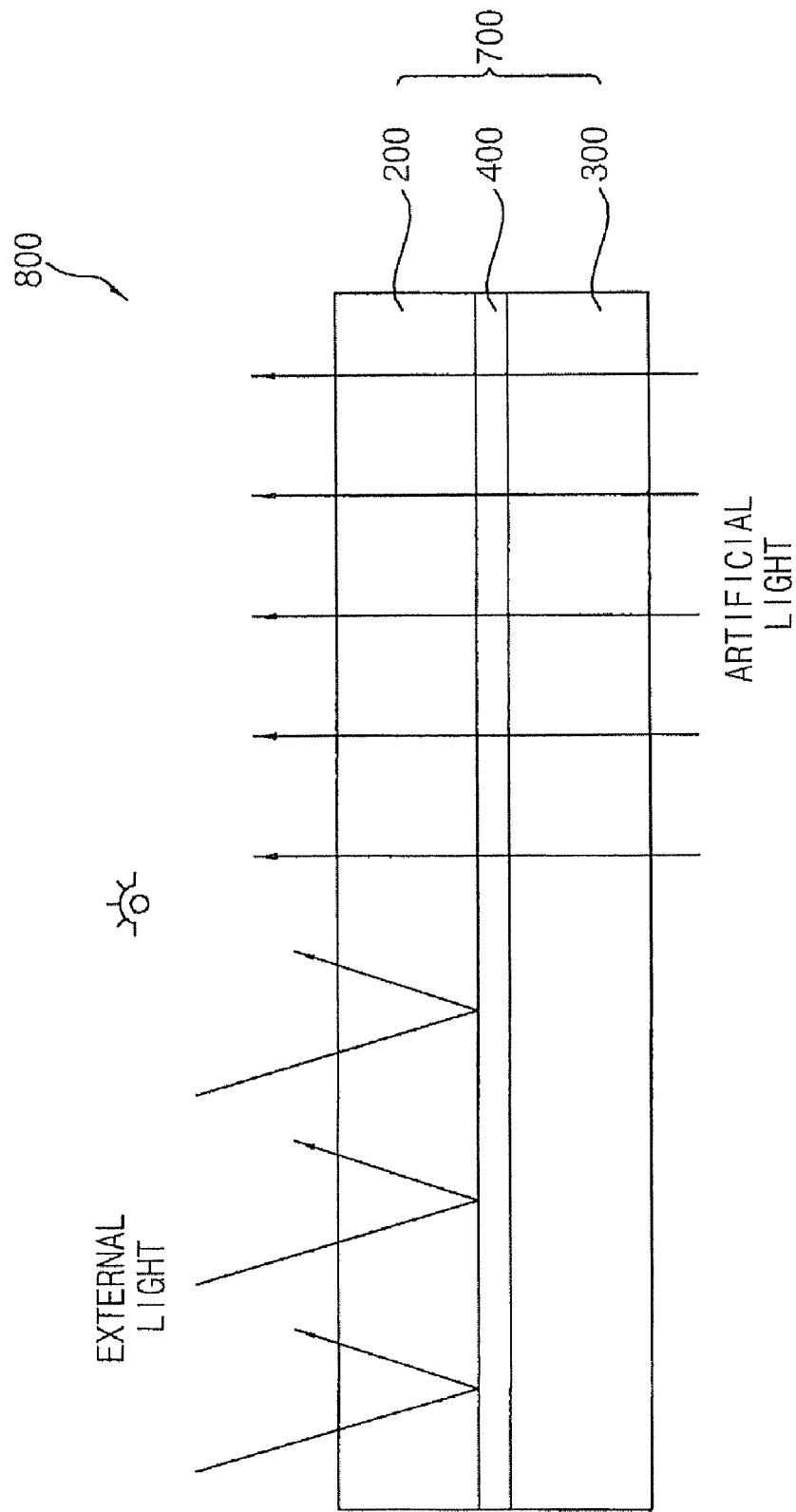
FIG. 2 is a schematic view showing a transreflective type LCD according to one embodiment of the present invention.
Figure 3:
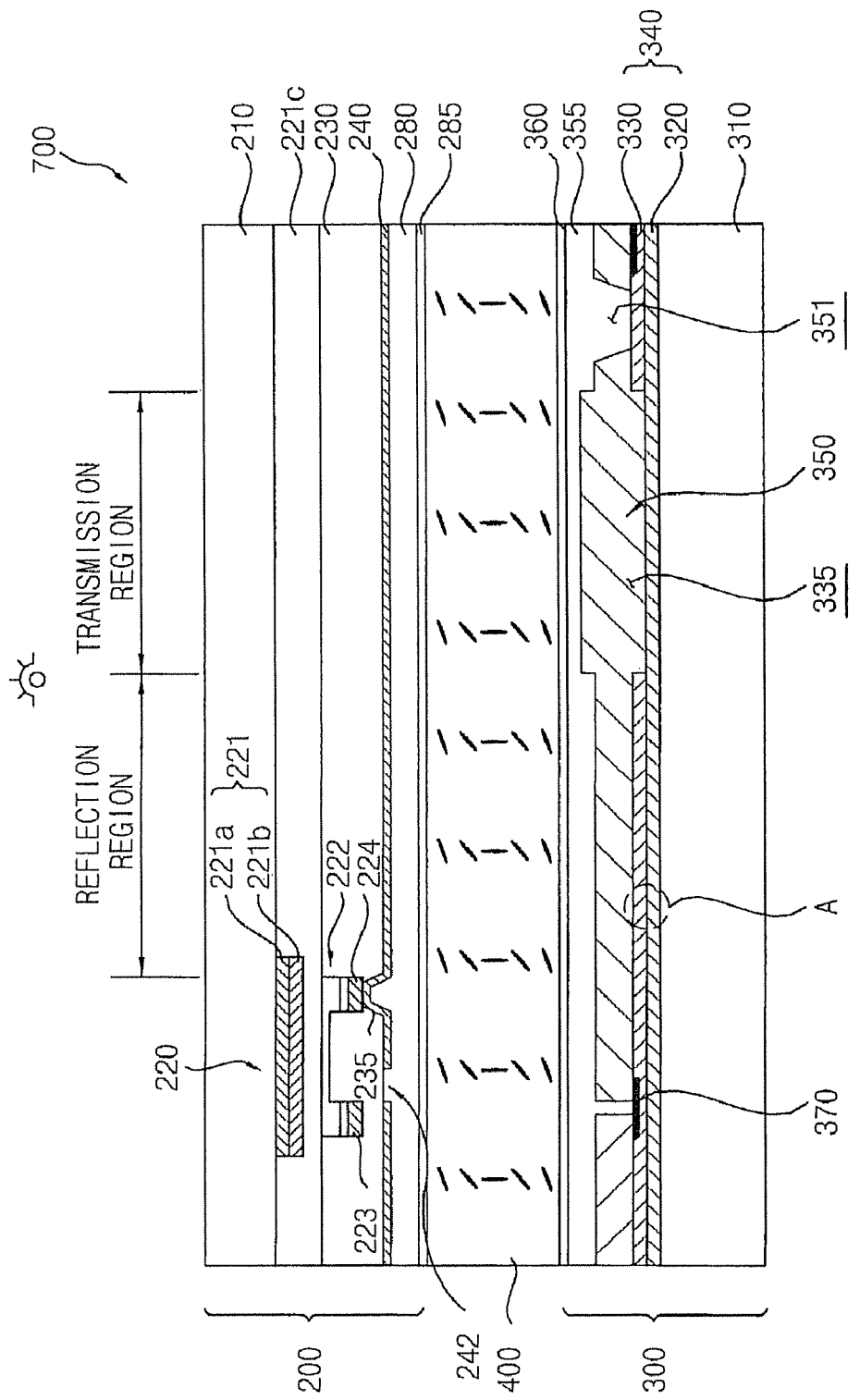
FIG. 3 is a cross-sectional view showing a structure of a transreflective type LCD according to one embodiment of the present invention.
Figure 4:
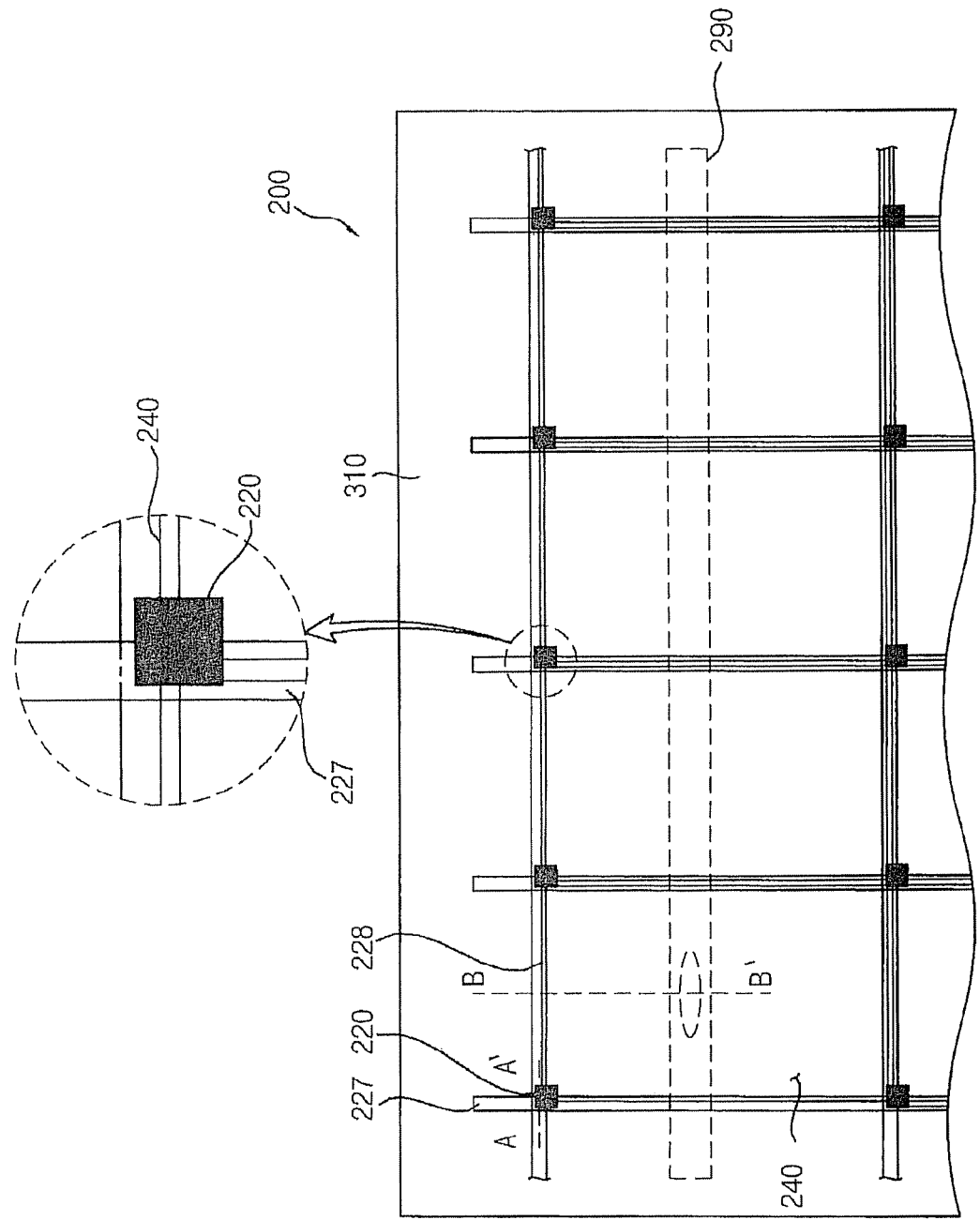
FIG. 4 is a plan view of the transreflective type LCD shown in FIG. 3.
Figure 5:
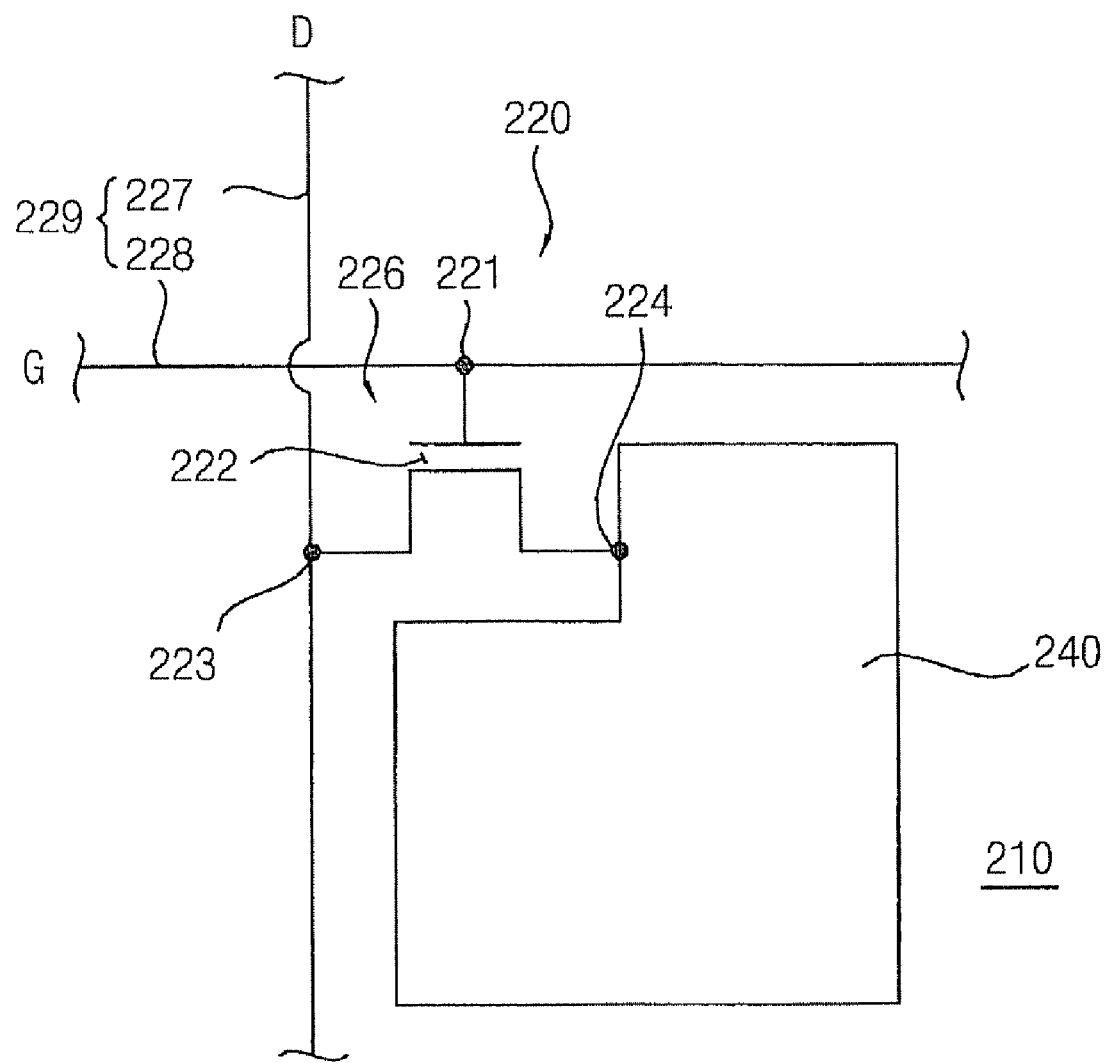
FIG. 5 is a circuit diagram showing a power supply unit and a first electrode shown in FIG. 4.

FIG. 2 is a schematic view showing a transreflective type LCD according to one exemplary embodiment of the present invention. FIG. 3 is a cross-sectional view showing a structure of a transreflective type LCD according to one exemplary embodiment of the present invention. FIG. 4 is a plan view of the transreflective type LCD shown in FIG. 3. FIG. 5 is a circuit diagram showing a power supply unit and a first electrode shown in FIG. 4.

Referring to FIG. 2, an LCD panel 700 of the transreflective type LCD 800 includes a first substrate 200, a second substrate 300 and a liquid crystal 400.

Referring to FIGS. 3 to 5, the first substrate 200 includes a first transparent substrate 210, a power supply unit 220, an organic insulating layer 230, a first electrode 240 and an alignment layer 280 having an alignment groove 285. The first transparent substrate 210 is made of a glass substrate. The power supply unit 220 disposed on the first transparent substrate 210 includes a TFT 226 and a signal line 229. The TFT 226 includes a gate electrode 221, a channel layer 222, a source electrode 223 and a drain electrode 224.

Figure 6:
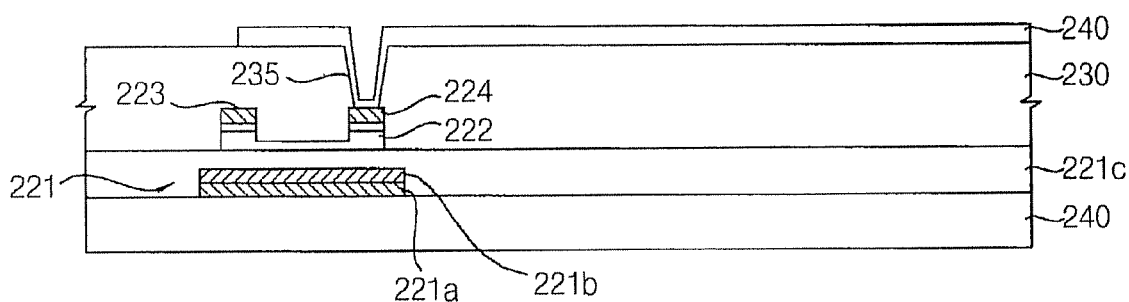
FIG. 6 is a cross-sectional view taken along the line of A-A for showing a structure of the transreflective type LCD shown in FIG. 4.
Figure 7:
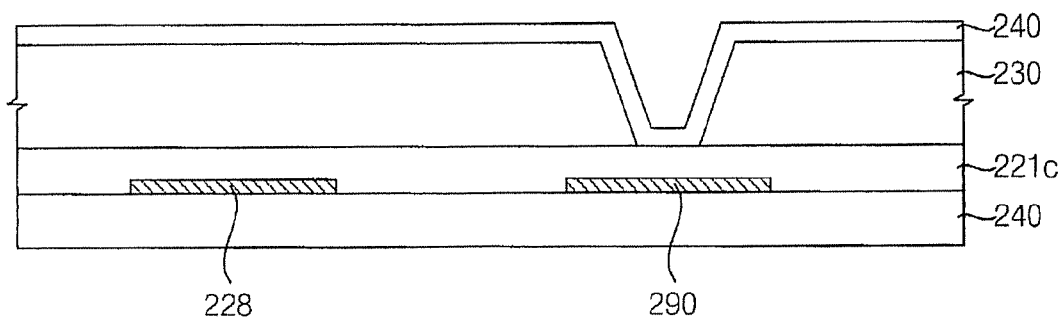
FIG. 7 is a cross-sectional view taken along the line of B-B for showing a structure of the transreflective type LCD shown in FIG. 4.
Figure 8:
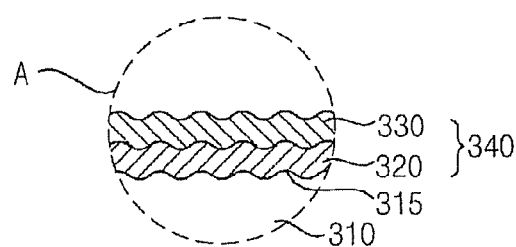
FIG. 8 is a partially enlarged view showing a structure of a light transreflective member shown in FIG. 3.

FIG. 6 is a cross-sectional view taken along the line of A-A for showing a structure of the transreflective type LCD shown in FIG. 4. FIG. 7 is a cross-sectional view taken along the line of B-B for showing a structure of the transreflective type LCD shown in FIG. 4. FIG. 8 is a partially enlarged view showing a structure of a light transreflective member shown in FIG. 3.

Referring to FIG. 6, the gate electrode 221 is formed on an upper surface of the first transparent substrate 210 to have a first area. The gate electrode 221 includes a first metal layer 221a having a first light reflectance and a second metal layer 221b having a second light reflectance higher than the first light reflectance and disposed on the first metal layer 221a. The first and the second metal layers 221a and 221b are made of a chrome oxide ($CrO_2$) and a chrome (Cr) films, respectively. The gate electrode 221 having two metal layers such as the first and the second metal layers 221a and 221b prevents a light toward the first metal layer 221a from being supplied to a user after being reflected from the first metal layer 221a. The second metal layer 221b of the gate electrode 221 is connected with a gate line 228 of the signal line 229. The gate line 228 is made of a transparent conductive material such as an ITO (Indium Tin Oxide) or an IZO (Indium Zinc Oxide).

As shown in FIG. 6, the channel layer 222 is disposed on the gate electrode 221 and an insulating layer 221c is disposed between the channel layer 222 and the gate electrode 221. The channel layer 222 has a second area smaller than the first area of the gate electrode 221 to prevent an abnormal operation of the power supply unit 220, which may be caused by exposing the channel layer 222 to the light. The channel layer 222 employs an amorphous silicon thin film layer or an $n^+$ amorphous silicon thin film layer doped by $n^+$ ions.

Referring to FIGS. 5 and 6, the source and the drain electrodes 223 and 224 are disposed on the channel layer 222 and insulated from each other. The source electrode 223 is connected with a data line 227 of the signal line 229. The data line 227 is formed by patterning a transparent thin film layer made of the ITO or the IZO. The organic insulating layer 230 is disposed on the power supply unit 220. The organic insulating layer 230 has a contact hole to expose a portion of the drain electrode 224 of the TFT 226. The first electrode 240 is connected with the drain electrode 224 of the TFT 226 through the contact hole 235. The first electrode 240 is formed by patterning a transparent thin film layer made of the ITO or the IZO.

Returning to FIG. 3, the second substrate 300 includes a second transparent substrate 310, a light transreflective member 340, a color filter 350 and a second electrode 360. Referring to FIG. 8, the second transparent substrate 310 has a projection 315 for improving a visual angle. The projection 315 can be formed by forming an organic insulating layer on the second transparent substrate 310, exposing the organic insulating layer and developing the exposed organic insulating layer.

As shown in FIGS. 3 and 8, the light transreflective member 340 is formed on the second transparent substrate 310 to cover the projection 315, so that the light transreflective member 340 has an uneven shape identical to a shape of the projection 315. The light transreflective member 340 includes a light transreflective thin film 320 for transmitting or reflecting the light and a light reflective thin film 330 for only reflecting the light. The light transreflective thin film 320 is made of aluminum or an aluminum alloy including at least one metal selected from the group consisting of neodymium (Nd), silicon (Si), copper (Cu), zinc (Zn), titanium (Ti), vanadium (V), cobalt (Co), nickel (Ni), tin (Sn), silver (Ag), palladium (Pd), molybdenum (Mo), zirconium (Zr), tantalum (Ta), tungsten (W) and gold (Au). The light transreflective thin film 320 has a thickness to ensure that a light reflectance is about 30% to about 50% and a transmissivity is about 50% to about 90%, with respect to an total amount of the light. For example, the light transreflective thin film 320 has a thickness of about 20 Å to about 800 Å and is made of an aluminum-neodymium (Al—Nd) alloy.

Figure 9:
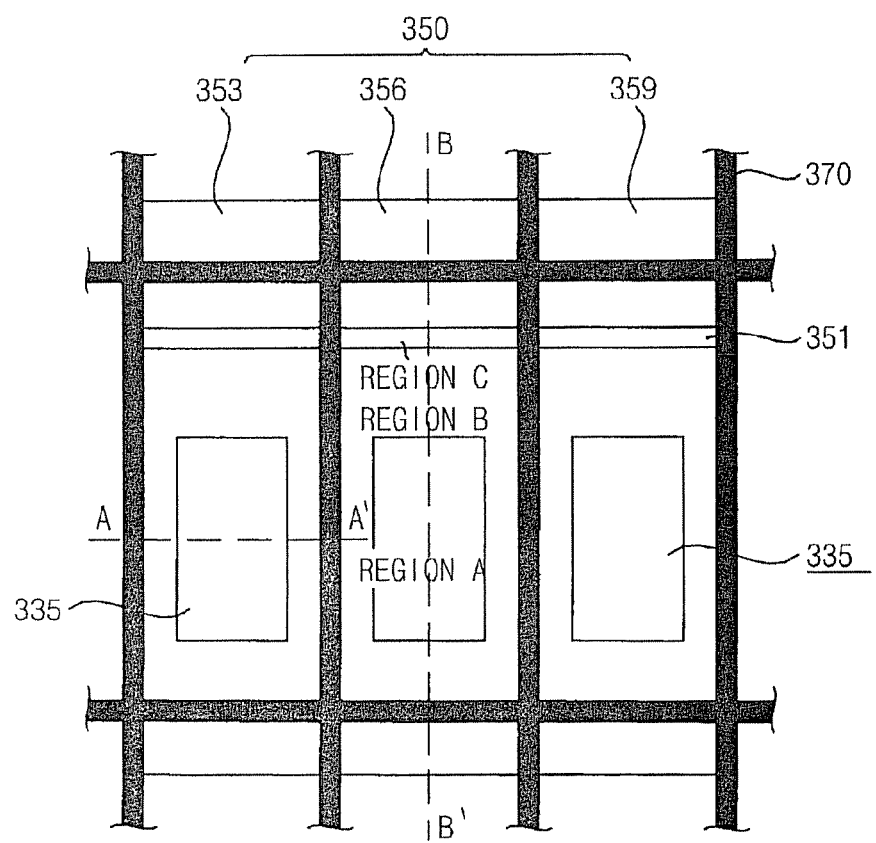
FIG. 9 is a plan view showing a structure of a color filter substrate of the transreflective member shown in FIG. 3.
Figure 10:
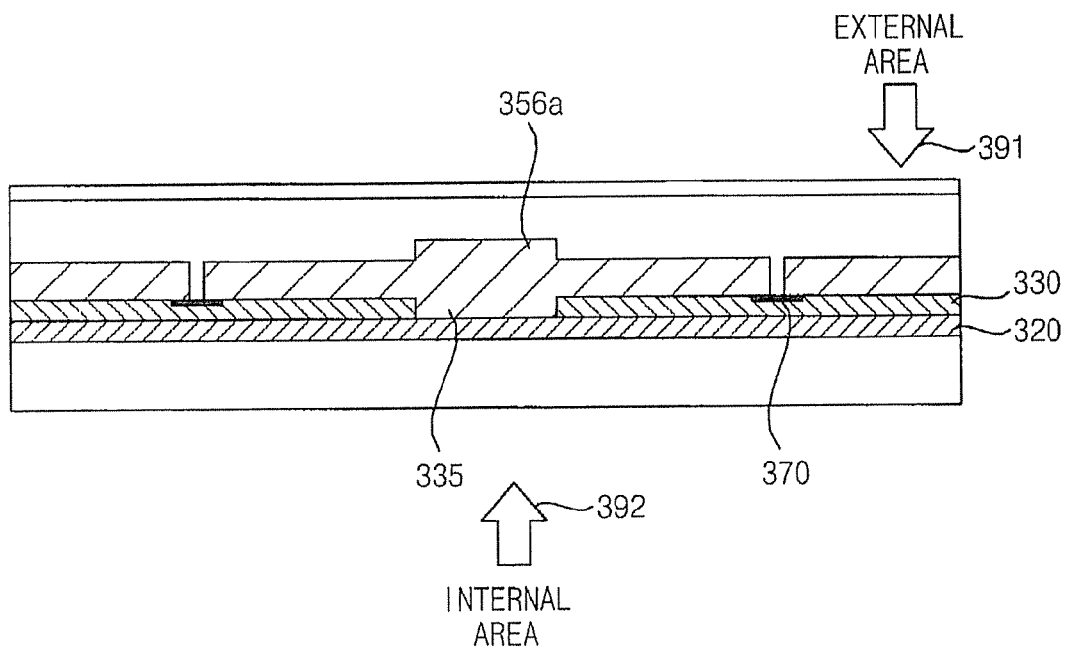
FIG. 10 is a cross-sectional view taken along the line of A-A for showing a structure of the color filter substrate shown in FIG. 9.

The light reflective thin film 330 is disposed on the light transreflective thin film 320. The light reflective thin film 330 has a thickness of about 5000 Å and is formed of silver or a silver alloy. As shown in FIGS. 9 and 10, the light reflective thin film 330 includes an opening 335 to expose a portion of the light transreflective thin film 320.

Where an external area of the light transreflective member 340 is lighter than an inner area thereof, a first light 391 supplied from an external reaches to the light reflective thin film 330 and the exposed portion of the light transreflective member 320. That is, the first light 391 is reflected from the light reflective thin film 330 and the exposed portion of the light transreflective member 320. Thus, the light utilizing efficiency of the external light increases by reflecting the first light using the portion of the light transreflective member 320.

Where the external area of the light transreflective member 340 is darker than the inner area thereof, an operation for displaying an image is substantially impossible because an amount of the light passing through the liquid crystal is not enough to display the image. In this case, a lamp (not shown) is turned on to generate a second light 392 from the internal area toward the external area. The second light 392 is supplied to the liquid crystal passing through a portion of the light transreflective member 320, which is not covered by the light reflective thin film 330. The light transreflective member 340 includes a light absorbing layer 370 corresponding to portions adjacent to the first electrode 240 of the first substrate 200. The light absorbing layer portion 370 absorbs the light passing through the portions adjacent to the first electrode 240. The light absorbing layer 370 may be formed by partially oxidizing the light reflective thin layer 330 using an ozone ($O_3$) or a chemical. Where the light reflective thin layer is formed of silver, the light absorbing layer 370 is a silver oxide layer.

Figure 11:
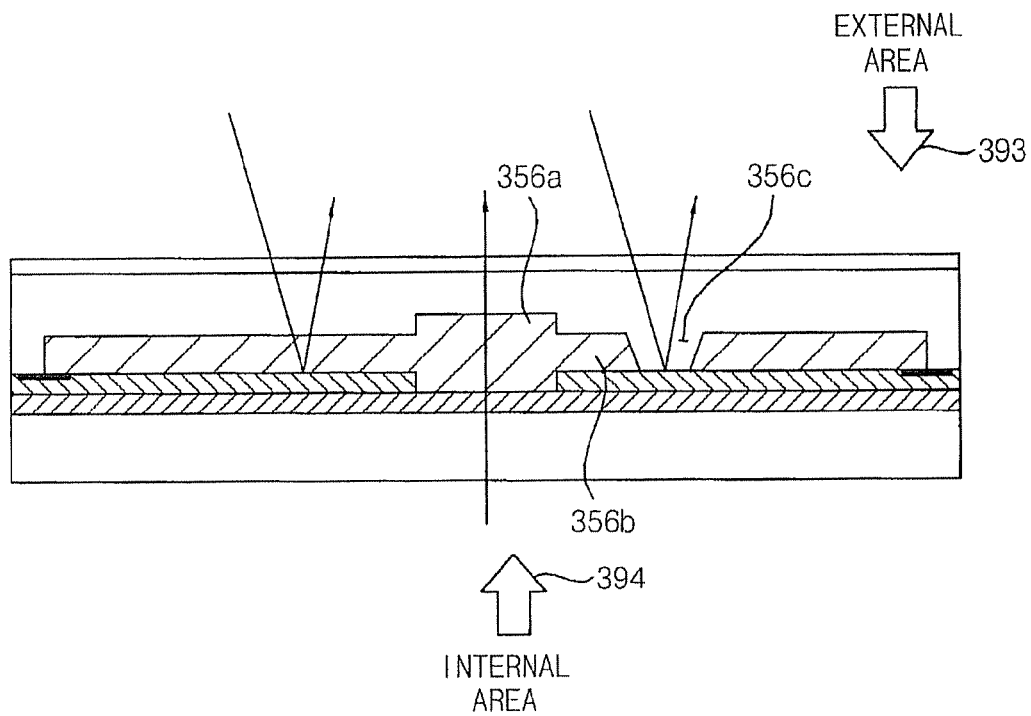
FIG. 11 is a cross-sectional view taken along the line of B-B for showing a structure of the color filter substrate shown in FIG. 9.

FIG. 9 is a plan view showing a structure of a color filter substrate of the transreflective member shown in FIG. 3. FIG. 10 is a cross-sectional view taken along the line of A-A for showing a structure of the color filter substrate shown in FIG. 9. FIG. 11 is a cross-sectional view taken along the line of B-B for showing a structure of the color filter substrate shown in FIG. 9.

The color filter 350 is disposed in a matrix shape on the second transparent substrate 310 having the light transreflective member 340 and the light absorbing layer 370. That is, a plurality of color filters is disposed on the second transparent substrate 310 in the matrix shape and a plurality of first electrodes are disposed on the first substrate 200 corresponding to the plurality of color filters, respectively. The color filter 350 corresponding to one first electrode 240 may have a various thickness to increase color reproducibility and a compound color according to display modes.

As shown in FIG. 9, the color filter 350 includes a red color filter 353, a green color filter 356 and a blue color filter 359. The red color filter emits a monochromatic light having a red wavelength, the green color filter emits a monochromatic light having a green wavelength and the blue color filter emits a monochromatic light having a blue wavelength by filtering the light.

Referring to FIG. 11, the green color filter 356 includes a first region 356a having a first thickness, a second region 356b having a second thickness thinner than the first thickness and a third region 356c having a third thickness thinner than the second thickness. The first region 356a is disposed on the opening 335 of the light reflective thin film 330 and the second and third regions 356b and 356c are separated apart from the opening 335 of the light reflective thin film 330. The third region 356c is disposed on a portion on which the color filter 350 is not formed. The color filter 350 having three portions, which have a different thickness from each other, decreases a difference in the color reproducibility between the reflective and transmissive modes.

As shown in FIG. 11, a light 393 supplied from the external area to the internal area sequentially passes through the first substrate 200, the liquid crystal 400 and the second region 356b having the second thickness. The light 393 reflected by the light transreflective thin film 320 passes through the second region 356b and is supplied to the liquid crystal 400. That is, a length of the path of the light 393 in the LCD is twice the second thickness.

A light 394 supplied from the internal area to the external area passes through the first region 356a having the first thickness and is supplied to the liquid crystal 400. The light 394 passes through the first substrate 200 and is supplied to the user. Since the first thickness is twice the second thickness, the light passing through the first region 356a of the color filter 350 has optical properties similar to those of the light passing through the second region 356b of the color filter 350.

Since the color filter 350 is not formed in the third region 356c, a portion of the light supplied from the external area to the internal area is reflected by the light reflective thin film 330. The light reflected from the third region 356c is a white light, so that the white light is mixed with the light reflected from the first and second regions 356a and 356b.

FIGS. 12A to 12I are cross-sectional views for illustrating a method of manufacturing a TFT substrate of the transreflective type LCD according to one exemplary embodiment of the present invention.

Figure 12A:
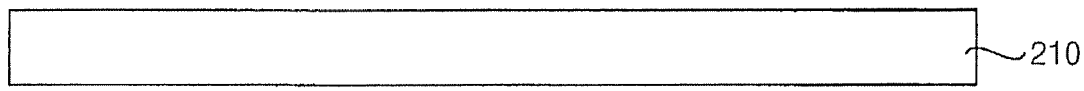
FIGS. 12A to 12I are cross-sectional views for illustrating a method of manufacturing a TFT substrate of the transreflective type LCD according to one embodiment of the present invention.
Figure 12B:
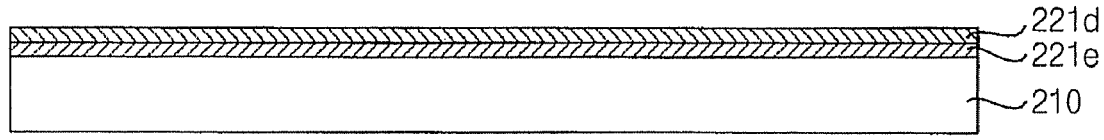
Figure 12C:
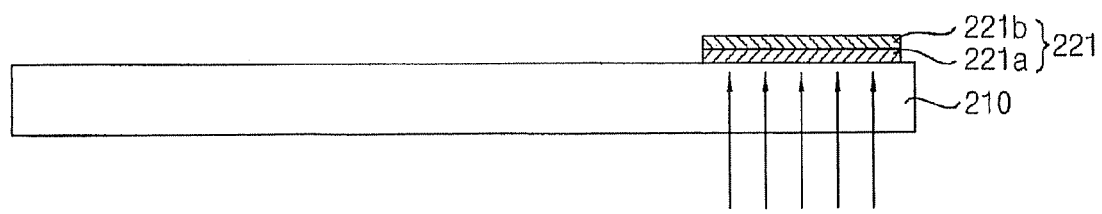

Referring to FIGS. 12A and 12C, a first metal layer 221e having a first light reflectance and a second metal layer 221d having a second light reflectance higher than the first light reflectance are sequentially formed on the first transparent substrate 210. The first and the second metal layers 221e and 221d are made of a chrome oxide ($CrO_2$) and a chrome (Cr) film, respectively. The first and second metal layers 221e and 221d are patterned to form the gate electrode 221 as shown in FIG. 12C. The first metal layer 221e controls reflection of the light incident from the external.

Figure 12D:
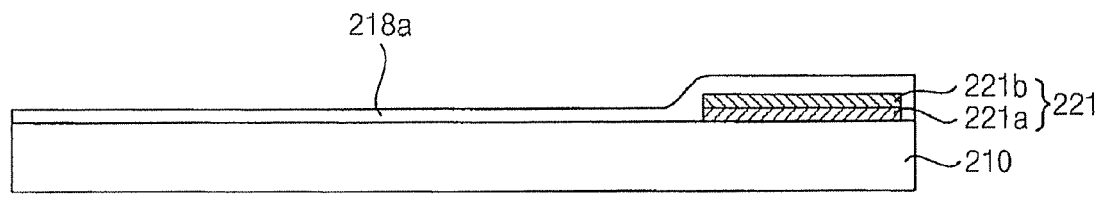
Figure 12E:
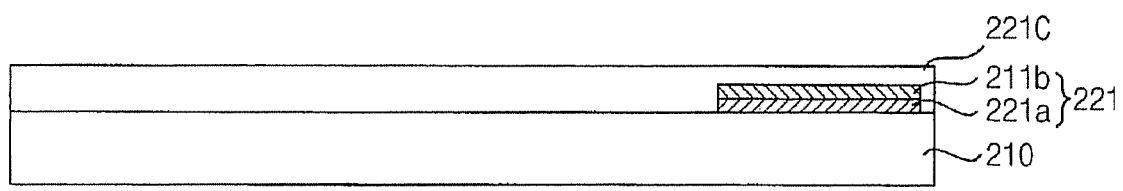

Referring to FIG. 12D, the transparent conductive material such as the ITO or the IZO is deposited on the first transparent substrate 210 to form a transparent conductive thin film layer 128a. The transparent conductive thin film layer 128a is patterned to form a transparent gate line 228 for connecting each of gate electrodes arranged in a same column to each other as shown in FIG. 4.

Figure 12F:
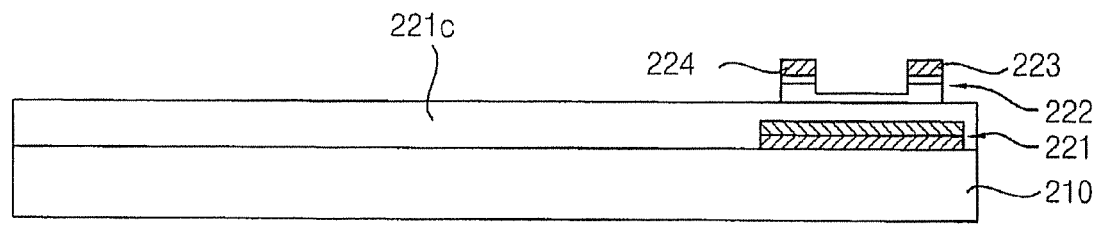

Referring to FIGS. 12E to 12I, the insulating layer 221c is formed over the first transparent substrate 210. The amorphous silicon thin film layer (not shown) and the $n^+$ amorphous silicon thin film layer (not shown) doped by $n^+$ ions are sequentially formed as shown in FIG. 12F. The amorphous silicon thin film layer and the $n^+$ amorphous silicon thin film layer doped by $n^+$ ions are patterned to form the channel layer 222.

The source/drain metal thin layer (not shown) is formed over the first transparent substrate 210 to cover the channel layer 222. The source/drain metal thin layer is patterned to form the source electrode 223 and the drain electrode 224 with the data line 227 as shown in FIG. 4. The data line 227 may be formed using the ITO or IZO through a separate process. The data line 227 is commonly connected with each of TFTs arranged in a same row among the TFTs arranged in the matrix shape.

Figure 12G:
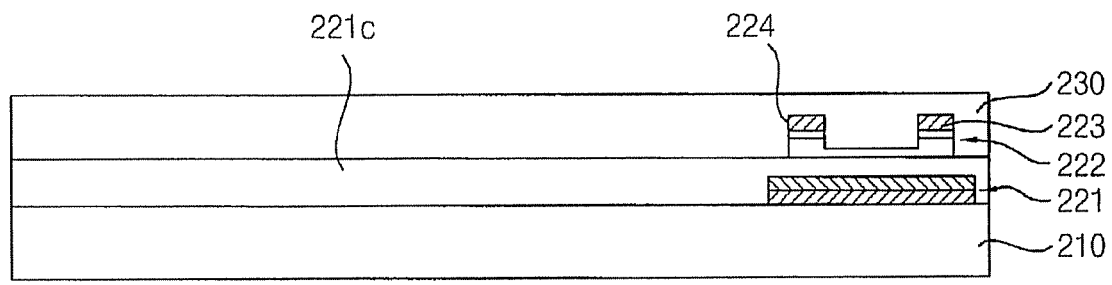
Figure 12H:
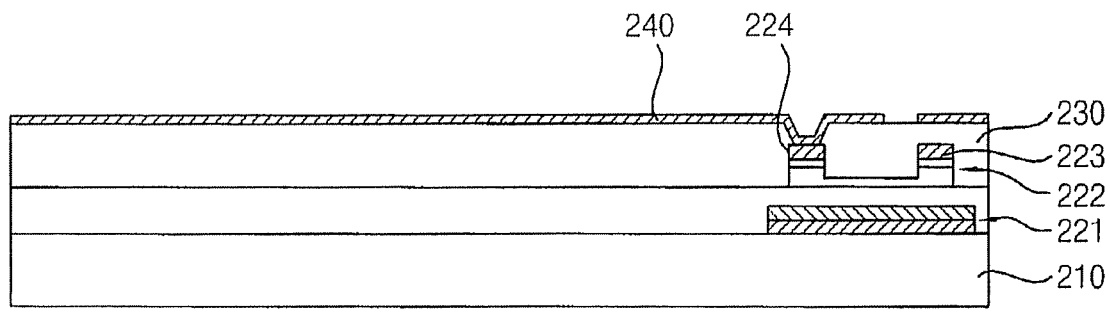
Figure 12I:
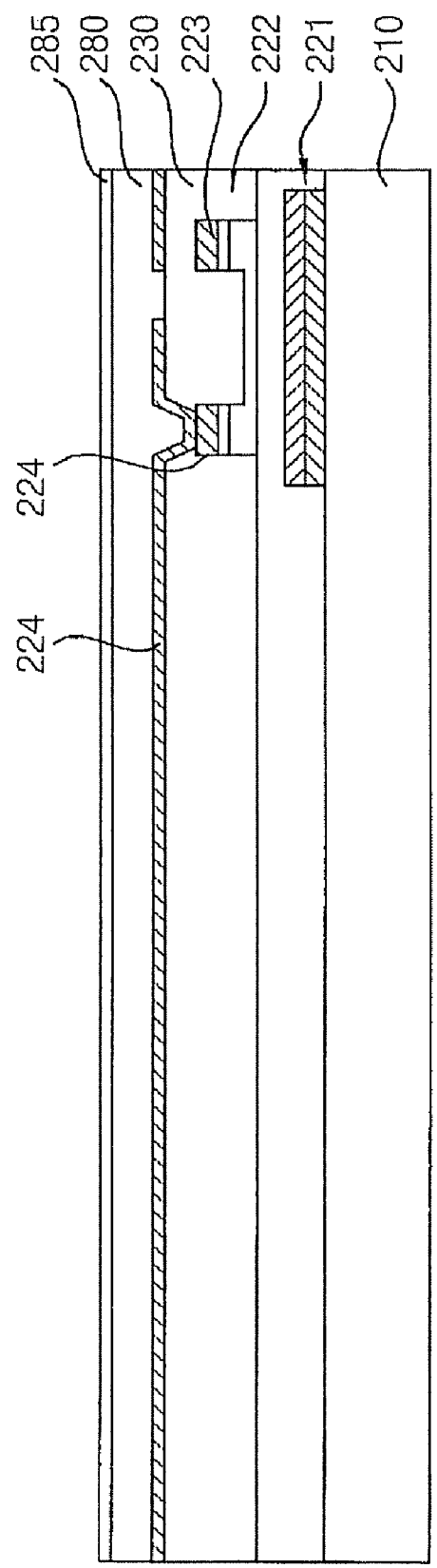

As shown in FIG. 12G, the organic insulating layer 230 is formed over the first transparent substrate 210 to cover the source and drain electrodes 223 and 224. The organic insulating layer 230 has a flat surface. The contact hole 235 is formed through the organic insulating layer 230 to expose the drain electrode 224 as shown in FIG. 12H. The transparent conductive thin film layer (not shown) is formed over the organic insulating layer 230 and patterned to form the first electrodes 240. The alignment layer 280 is formed on the first transparent substrate 210 to cover the first electrode 240 and the alignment groove 285 is formed on the alignment layer 280 as shown in FIG. 12I.

FIGS. 13A to 13K are cross-sectional views for illustrating a method of manufacturing a color filter substrate of the transreflective type LCD according to one exemplary embodiment of the present invention.

Figure 13A:
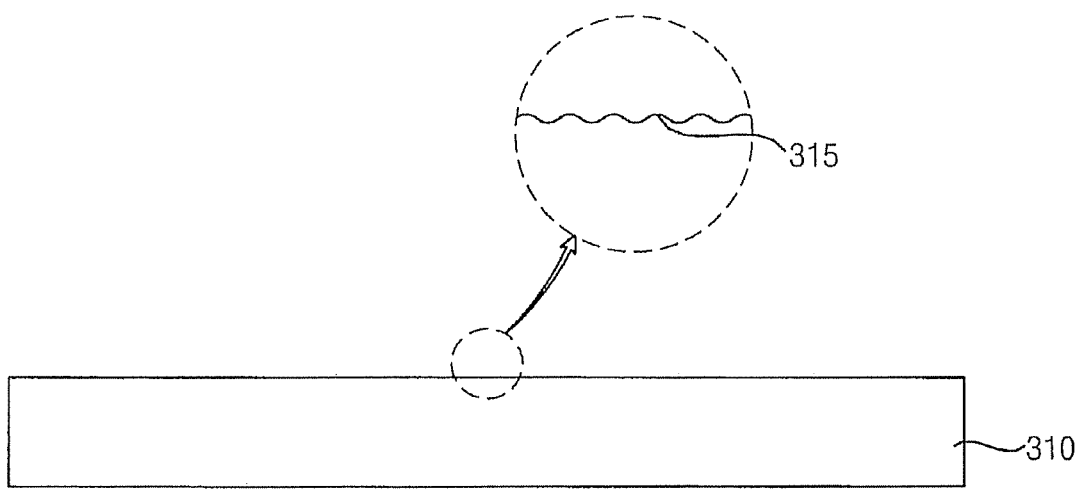
FIGS. 13A to 13K are cross-sectional views for illustrating a method of manufacturing a color filter substrate of the transreflective type LCD according to one embodiment of the present invention.

Referring to FIG. 13A, the second transparent substrate 310 has the projection 315 for increasing the visual angle. The projection 315 may be formed on the second transparent substrate 310 while forming the second transparent substrate 310. For example, a surface of the second transparent may be treated to have a projection and a recession.

Figure 13B:
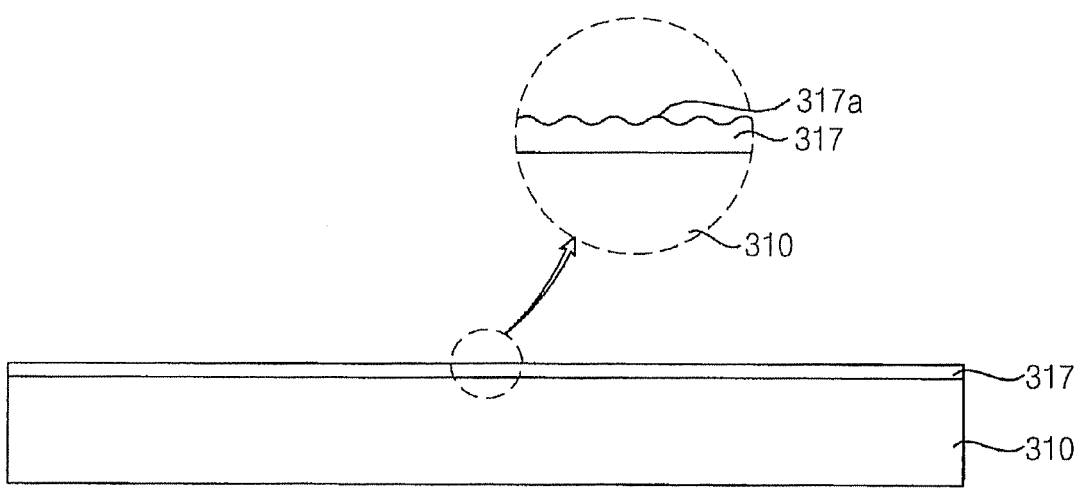

As shown in FIG. 13B, the projection 315 may be formed through a separate process. That is, the organic insulating layer 317 and a photoresist layer are sequentially formed on the second transparent substrate 310. The photoresist layer is patterned to form a photoresist pattern by exposing and developing. When etching the organic insulating layer 317 using the photoresist pattern as an etching mask, the projection 317a is formed on the organic insulating layer 317.

Figure 13C:
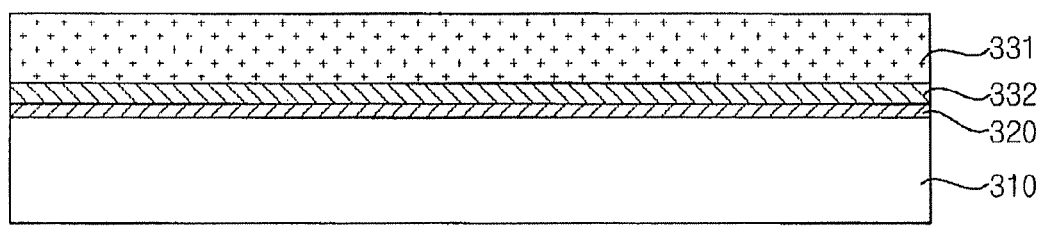

Referring to FIG. 13C, the light transreflective thin film 320 and the light reflective thin film 330 are sequentially formed on the projection 315. Particularly, the light transreflective thin film 320 is formed to have the thickness of about 20 Å to about 800 Å, e.g., using an aluminum-neodymium (Al—Nd) alloy. On the light transreflective thin film 320, a light reflective thin film layer 332 is formed to have a thickness of about 5000 Å, e.g., using silver or a silver alloy.

Figure 13D:
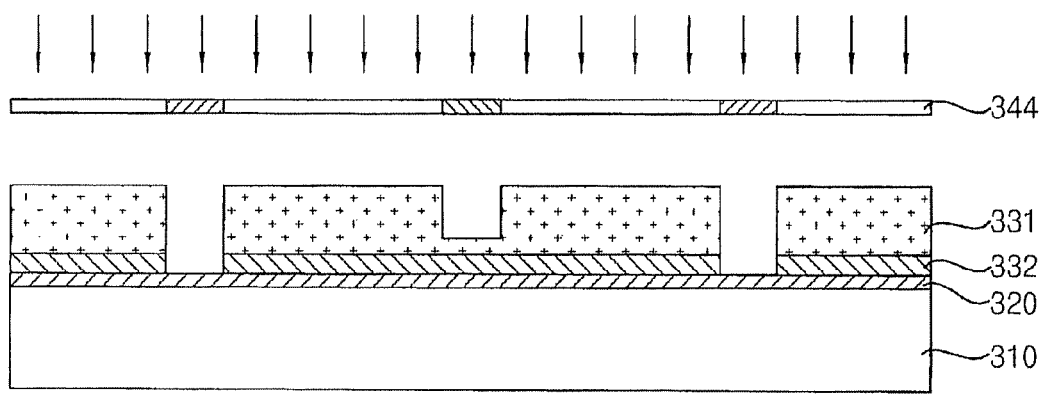

Referring to FIG. 13D, a photoresist layer 331 is formed over the light reflective thin film layer 332 and a negative type photoresist layer is provided as the photoresist layer 331. A pattern mask 344 is aligned on the photoresist layer 331 and the pattern mask 344 provides a light having a various amount depending on a position of the photoresist layer 331 to the photoresist layer 331. A portion of the photoresist layer 331 is completely exposed to form a light transmissive window and a portion of the photoresist layer 331 is partially exposed to form a light absorbing window as shown in FIG. 13D.

Figure 13E:
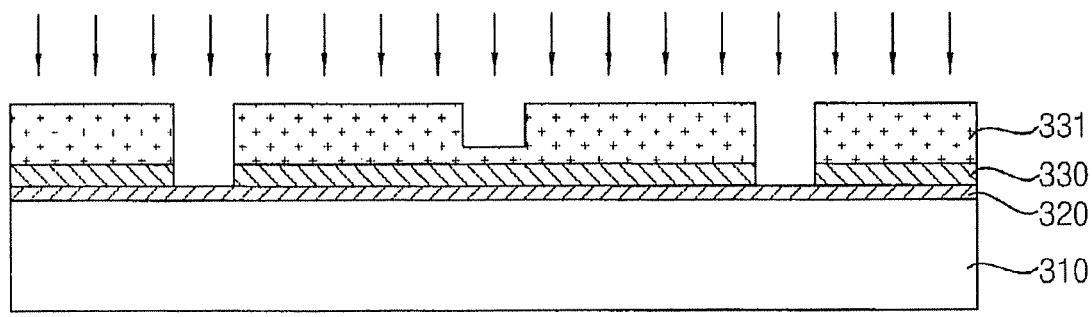
Figure 13F:
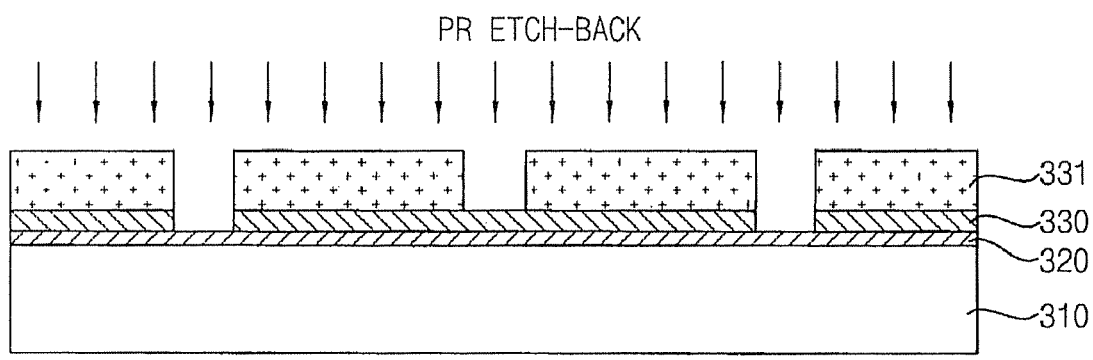

Referring to FIGS. 13E and 13F, the photoresist layer 331 is etched by an etch-back process, so that the light reflective thin film layer 332 to form the opening 335. Hereinafter, the light reflective thin film layer 332 having the opening 335 is called the light reflective thin film 330. The portion of the light transreflective thin film 320 disposed under the light reflective thin film 330 is exposed through the opening 335 of the light reflective thin film 330. The portion on which the light absorbing layer is formed is exposed by etching the photoresist layer 331 using the etch-back process as shown in FIG. 13F.

Figure 13G:
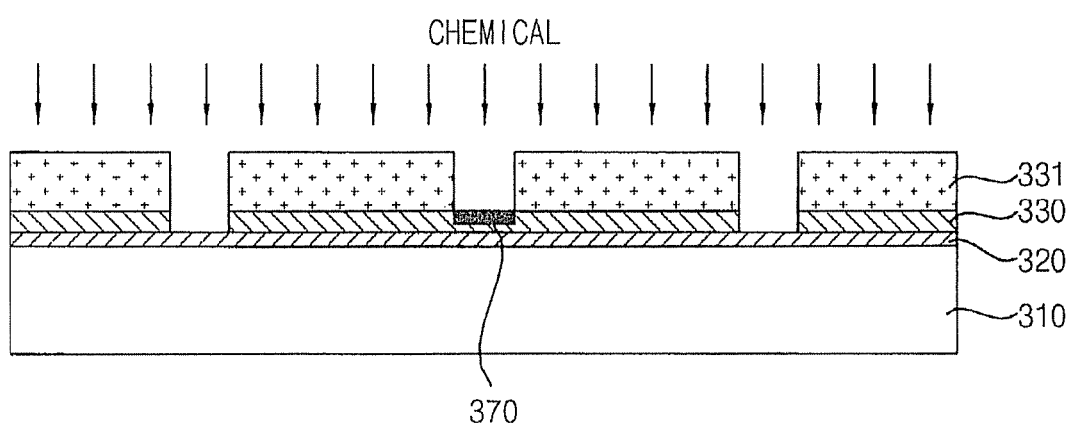

As shown in FIG. 13G, the silver oxide layer used as the light absorbing layer 370 is formed on the exposed portion of the light reflective thin film 330. The light reflective thin film 330 is oxidized, e.g., using the ozone ($O_3$) or the chemical that selectively oxidizes silver (Ag). After stripping the photoresist layer 331, the color filter 350 is formed on the second transparent substrate 310. The color filter 350 includes the red color filter, the green color filter and the blue color filter.

Figure 13H:
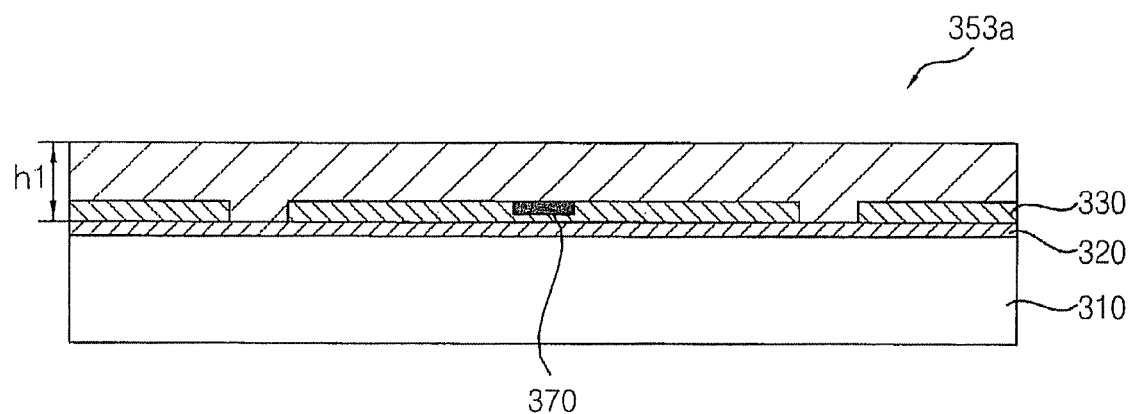
Figure 13I:
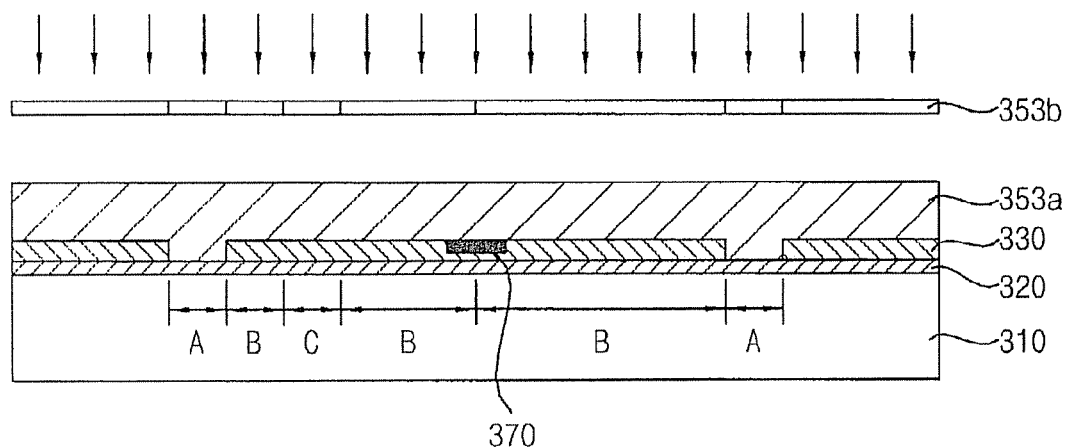
Figure 13J:
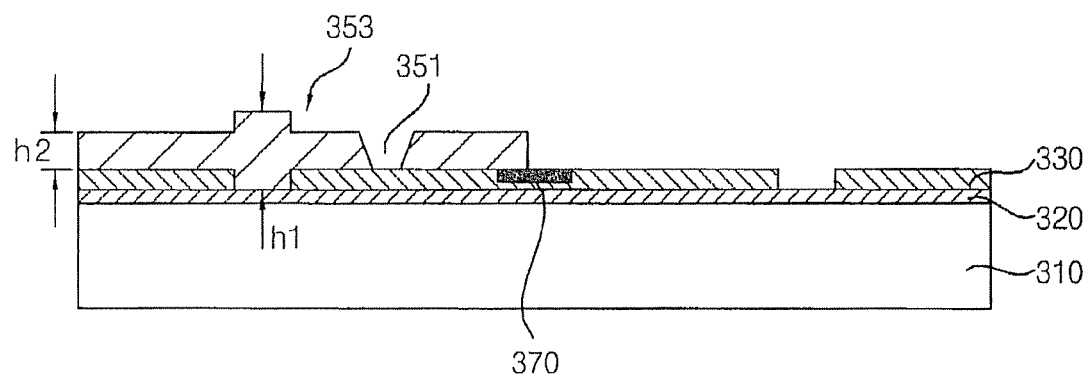

Referring to FIGS. 13H to 13J, a red color filter thin film layer 353a having a first height "h1" is formed over the second transparent substrate 310 using a red color filter material. The red color filter material emits the monochromatic light having the red wavelength, the red color filter material is made of a photosensitive material, particularly, a negative-type photosensitive material. A pattern mask 353b is disposed on the red color filter thin film layer 353a as shown in FIG. 13I. An amount of the light passing through a portion of the pattern mask 353b corresponding to the region "A" on which the light transmissive window is formed is smaller than an amount of the light passing through a portion of the pattern mask 353b corresponding to the region "B" shown in FIG. 9. The amount of the light passing through the portion of the pattern mask 353b corresponding to the region "B" is smaller than an amount of the light passing through a portion of the pattern mask 353b corresponding to the region "C" shown in FIG. 9.

Figure 13K:
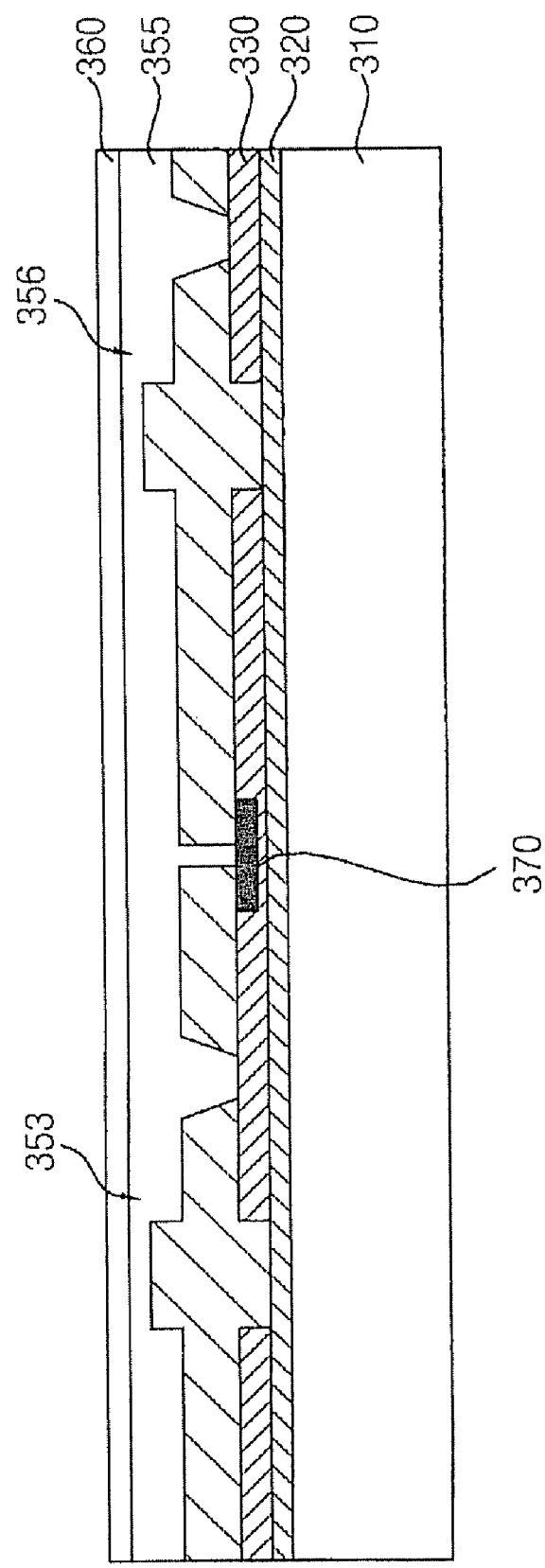

The red color filter thin film layer 353b is patterned to form the red color filter 353. The red color filter 353 has the first thickness "h1" in the portion corresponding to the region "A" and the second thickness "h2" in the portion corresponding to the region "B", which is thinner than the first thickness "h1". In the region "C", there is no red color filter, thus a portion of the light reflective thin film 330 is exposed. The green color filter and the blue color filter are formed through processes identical to processes applied to form the red color filter 353 as shown in FIG. 13K.

An over coating thin film 355 is formed on the color filter 350 and the second electrode 360 is formed on the over coating thin film 355. The second electrode 360 is made of a transparent conductive material such as the ITO or the IZO.

According to the transreflective type LCD and method of manufacturing the same, it is able to easily form a projection for increasing the visual angle and the uniformity of the brightness. Also, it is able to decrease the difference of the image between the transmissive and the reflective modes.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A transreflective LCD comprising:
   a first substrate including:
      a first transparent substrate having a thin film transistor; and
      a first electrode disposed on the first transparent substrate;
   a second substrate including:
      a second transparent substrate facing the first transparent substrate;
      a light transreflective member disposed on the second transparent substrate, the light transreflective member transmitting a first light supplied from the second transparent substrate to the first transparent substrate and reflecting a second light in a direction of the first light, the second light being supplied from the first transparent substrate to the second transparent substrate in an opposite direction of the first light;
      a color filter disposed on the light transreflective member; and
      a second electrode disposed over the color filter; and
   a liquid crystal interposed between the first substrate and the second substrate,
   wherein the light transreflective member and the first transparent substrate having the thin film transistor are disposed at opposite sides, respectively, of the liquid crystal;
   wherein the light transreflective member comprises a light transreflective thin film disposed on the second substrate and a light reflective thin film disposed directly on the light transreflective thin film, and
   wherein the color filter has a stepped portion between a reflection region and a transmission region.

2. The transreflective LCD of claim 1, further comprising an over coating thin film between the color filter and the second electrode, a surface of the over coating thin film facing the color filter having a stepped portion between the reflection and transmission regions.

3. A transreflective LCD including a reflection region and a transmission region adjacent to the reflection region, the transreflective LCD comprising:
   a first substrate including:
      a first transparent substrate having a thin film transistor; and
      a first electrode disposed on the first transparent substrate;
   a second substrate including:
      a second transparent substrate facing the first transparent substrate;
      a visual angle improving member disposed on the second transparent substrate, the visual angle improving member having an uneven surface;
      a light transreflective member disposed on the second transparent substrate to cover the visual angle improving member, the light transreflective member including a first region which corresponds to the transmission region, partially reflects a second light supplied from the first transparent substrate toward the first substrate and transmits a first light supplied from the second transparent substrate toward the first transparent substrate, and a second region which corresponds to the reflection region and reflects the second light toward the first transparent substrate; and
      a color filter disposed on the light transreflective member; and
   a liquid crystal interposed between the first substrate and the second substrate,
   wherein the light transreflective member and the first transparent substrate having the thin film transistor are disposed at opposite sides, respectively, of the liquid crystal.

4. The transreflective LCD of claim 3, further comprising a second electrode disposed over the color filter.

5. The transreflective LCD of claim 3, wherein the light transreflective member comprises a light transreflective thin film disposed on the second substrate and a light reflective thin film disposed directly on the light transreflective thin film.

6. The transreflective LCD of claim 5, wherein the light reflective thin film has an opening corresponding to the first region, to expose a portion of the light transreflective thin film.

7. The transreflective LCD of claim 6, wherein the light transreflective thin film reflects the second light through the exposed portion when the first transparent substrate is lighter than the second transparent substrate, and transmits the first light through the exposed portion when the second transparent substrate is lighter than the first transparent substrate.

8. The transreflective LCD of claim 5, wherein the light transreflective member has a stepped portion between the reflection and transmission regions, the stepped portion is defined by an end portion of the light reflective thin film disposed on the light transreflective thin film.

9. A transreflective LCD comprising:
   a first substrate including:
      a first transparent substrate having a thin film transistor; and
      a first electrode disposed on the first transparent substrate;
   a second substrate including:
      a second transparent substrate facing the first transparent substrate;
      a visual angle improving member having an uneven surface, and a light transreflective member is disposed on the second transparent substrate to cover the visual angle improving member;
      the light transreflective member disposed on the visual angle improving member, the light transreflective member transmitting a first light supplied from the second transparent substrate to the first transparent substrate and reflecting a second light in a direction of the first light, the second light being supplied from the first transparent substrate to the second transparent substrate in a direction of the first light;
      a color filter disposed on the light transreflective member; and a second electrode disposed over the color filter; and
a liquid crystal interposed between the first substrate and the second substrate,
wherein the light transreflective member and the first transparent substrate having the thin film transistor are disposed at opposite sides, respectively, of the liquid crystal, and
wherein the transreflective LCD has a reflection region and a transmission region adjacent to the reflection region, and the light transreflective member has a first region which corresponds to the transmission region, partially reflects the second light toward the first substrate and transmits the first light, and a second region which corresponds to the reflection region and reflects the second light toward the first substrate.

10. The transreflective LCD of claim 9, wherein the visual angle improving member comprises an organic insulating layer having the uneven surface.

11. The transreflective LCD of claim 9, wherein the visual angle improving member is integrally formed with the second transparent substrate, and corresponds to an upper surface of the second transparent substrate.

12. The transreflective LCD of claim 9, wherein the light transreflective member consists of the light transreflective thin film disposed on the second substrate and the light reflective thin film disposed directly on the light transreflective thin film.

* * * * *